3,062,860
PREPARATION OF NITRILES FROM UNSATURATED HYDROCARBONS AND HYDROGEN CYANIDE

Herman S. Bloch, Skokie, Ill., assignor to Universal Oil Products Company, Des Plaines, Ill., a corporation of Delaware
No Drawing. Filed Feb. 26, 1959, Ser. No. 795,610
9 Claims. (Cl. 260—465.3)

This invention relates to a process for the preparation of nitriles, and more specifically, relates to a process for the reaction of unsaturated hydrocarbons with hydrogen cyanide in the presence of a catalyst to form said nitriles.

The general utility of the nitrile class of organic compounds is well known. Innumerable organic chemical processes are made possible by the use of nitriles as intermediate materials. Useful products such as amines, acids, ketones, and dicarboxylic acids used in the manufacture of polymeric amides may be produced. This process is particularly well adapted to the production of acrylonitrile which is a basic ingredient in the manufacture of synthetic rubber, plastics, and fibers such as are derived from polyacrylonitrile and the co-polymer of acrylonitrile and vinyl chloride.

The preparation of nitriles for commercial use appears to be most readily and economically accomplished by the single step addition of hydrogen cyanide to olefinic or acetylenic hydrocarbons. This particular reaction has been applied commercially utilizing aqueous liquid phase catalysis which is generally a low temperature reaction but which tends to give undesirable side products which are in part attributable to the aqueous medium. For example, when acetylene is reacted with hydrogen cyanide in the presence of an aqueous solution of cuprous chloride, acetaldehyde is formed as a by-product. This can be eliminated by conducting the reaction in the vapor phase in an anhydrous medium although in the past this has resulted in lower recoveries and has required high reaction temperatures. It is therefore the object of the present invention to set forth a process for the single step, vapor phase reaction of hydrogen cyanide with olefinic or acetylenic hydrocarbons under anhydrous conditions at reduced temperatures and pressures. A more specific object is to provide a catalyst which will enable the reaction to be carried out under conditions of reduced temperature and pressure. Additional and more specific objectives will become apparent in the following specifications.

One embodiment of this invention relates to a process for the preparation of a nitrile which comprises reacting an unsaturated hydrocarbon with hydrogen cyanide in the presence of a catalyst comprising a boron halide adsorbed on an inert solid adsorbent, and recovering the resultant nitrile.

Another embodiment relates to a process for the preparation of a nitrile which comprises reacting an acetylenic hydrocarbon with hydrogen cyanide in the presence of a catalyst comprising boron trifluoride adsorbed on an activated alumina, at a temperature of from about 0° C. to about 200° C. and at a pressure of from about atmospheric to about 10 atmospheres, and recovering the resultant nitrile.

A further embodiment relates to a process for the preparation of acrylonitrile which comprises reacting acetylene with hydrogen cyanide in the presence of a catalyst comprising boron trifluoride adsorbed on gamma alumina, at a temperature of from about 0° C. to about 75° C. and at a pressure of from about atmospheric to about 5 atmospheres, and recovering the resultant acrylonitrile.

The objectives of this invention as set forth above are accomplished by the use of a particular catalyst comprising an inert, solid adsorbent and small quantities of a boron halide, preferably boron trifluoride. Other boron halides which may be utilized, but not necessarily with equivalent results, include boron trichloride, boron tribromide, etc. The catalytic element of this invention can be utilized in any one of several ways. For example, the boron halide is adsorbed on a suitable inert, solid adsorbent, and/or supplied continuously or intermittently to the system in minute quantities. The concentration of the boron halide should be such as to amount to about 0.1 mol to about 0.001 mol per mol of reactant. The boron halide so supplied to the system as free boron halide aids in sustaining the catalyst life through adsorption on the solid adsorbent present in the catalyst bed, thus replenishing such boron halide as may be washed from the catalyst due to continuous and extended operation.

It is important that the material seletced to act as a solid adsorbent be possessed of certain desirable characteristics. Broadly speaking, it must be an inert adsorbent such that it will retain but not react adversely with the boron halide nor with the reactants. Solid, inert adsorbents include, for example, alumina, activated carbon, silica gel, and others, but activated alumina and especially gamma and theta aluminas are preferred.

The catalyst can be prepared in any ocnventional manner. As an illustration a predried gamma-alumina is subjected to a stream of boron trifluoride to the point of saturation. When the catalyst is in equilibrium with the boron trifluoride stream, the result will be a catalyst containing from about 2% to about 30% of combined boron trifluoride. A catalyst containing from about 5% to about 12% of combined boron trifluoride is preferred.

In accordance with the present invention, unsaturated hydrocarbons are reacted with hydrogen cyanide to prepare nitriles. Anhydrous hydrogen cyanide of commercial grade can be utilized. The term "unsaturated hydrocarbons" is intended to include alkenes as well as alkadienes and alkynes, both open chain and cyclics. Suitable alkenes include ethylene, propene, 1-butene, 2-butene, 3-methyl-1-butene, 3,3-dimethyl-1-butene, 1-pentene, 2-pentene, 2-methyl-1-pentene, 3-methyl-1-pentene, 4-methyl-1-pentene, 2-methyl-2-pentene, 3-methyl-2-pentene, 4-methyl-2-pentene, and others. Cyclobutene, cyclopentene, methyl-cyclopentene, cyclohexene, etc., are representative of cycloalkenes which may be utilized in the process. Butadiene, piperylene, isoprene, cyclopentadiene, vinylcyclohexene, and cyclohexadiene are examples of alkadienes. Alkynes which can be utilized include acetylene, propyne, 1-butyne, 2-butyne, 3-methyl-1-butyne, 3,3-dimethyl-1-butyne, 1-pentyne, 2-pentyne, 4-methyl-1-pentyne, 4,4-dimethyl-1-pentyne, 3-methyl-1-pentyne, 3,3-dimethyl-1-pentyne, 4-methyl-2-pentyne, 4,4-dimethyl-2-pentyne, 1-hexyne, 2-hexyne, 3-hexyne, etc., as well as others. It is also contemplated within the scope of this invention that acetylenic hydrocarbons containing an olefinic group in addition to an acetylenic triple bond may be used; such as compound is mono-vinylacetylene.

Unsaturated hydrocarbons which contain less than 10 carbon atoms per molecule are usually preferred since such hydrocarbons are more easily reacted. However, it is not intended to so limit the broad scope of this invention and it is contemplated that unsaturated hydrocarbons of higher molecular weight may be employed although not necessarily with equivalent results.

The reactants of this process are continuously passed over the catalyst at a predetermined ratio and rate. The mol ratio of the reactants is not critical and can be varied over a relatively wide range. In general it is determined by the particular unsaturated hydrocarbon employed and the degree of cyanation desired. As an example, in the preparation of acrylonitrile an excess of acetylene is generally used and a mol ratio of from about 1:1 to about 10:1 is operable although a mol ratio of about 1.5:1 to about 4:1 is preferred.

The activity of the catalyst permits the use of high space velocities without adverse effect upon the rate of conversion, for example, when the reactants are such as to constitute a vapor phase reaction a gaseous hourly space velocity in the range of from about 500 to 2500 or more is suitable while a space velocity in the range of from about 1000 to about 2000 is utilized for optimum results.

An additional feature of this invention is that the reaction takes place at a comparatively low temperature and pressure. A reaction temperature in the range of from about 0° C. to about 200° C. or more is suitable. When the reactants permit, a milder temperature in the range of from about 0° C. to about 75° C. is preferred to further minimize formation of undesirable side products. Specific temperatures are dependent on the reactants employed. The reaction to which this invention applies is exothermic. To aid in accurately controlling the temperature as well as side reactions and to insure the passage of the reactants through the catalyst bed an inert diluent gas such as nitrogen or propane or the like, may be used.

The reaction proceeds at reasonably low pressures. While pressure does not appear to be an important variable, it is desirable to operate in the range of from about atmospheric to about 10 atmospheres per square inch. When the particular reactants permit, it is preferred to operate at a pressure in the range of from about atmospheric to about 5 atmospheres.

The process of this invention is preferably accomplished by continuous flow methods. Accordingly, the supported catalyst is packed in a suitable reactor tube, usually of stainless steel construction although other materials may be used. Air is removed from the system by flushing with nitrogen or other inert gases. The reactants may be introduced to the reactor either concurrently or in separate streams. However, it is preferred that the reactants be premixed and thus introduced into the reaction zone. The product may be recovered in any one of several ways. For example, the reactor effluent is immediately subjected to a mild caustic wash followed by passage through a condenser, said condenser being maintained at a temperature such as to condense the cyanated product and allow the gaseous reactants to pass on for further separation and recycle. The product from the condenser is passed to a fractionating column for further recovery.

An alternative method for the recovery of the nitrile product from the reactor effluent after said effluent has been subjected to a mild caustic wash consists in the absorption of said effluent in a suitable petroleum fraction such as kerosene, followed by fractional distillation of the nitrile enriched petroleum fraction to yield a substantially pure nitrile.

The process of this invention is illustrated further by the following examples which are introduced solely for the purpose of illustration and with no intention of unduly limiting the generally broad scope of this invention.

*Example I*

50 grams of a catalyst comprising gamma alumina impregnated with about 10% by weight of boron trifluoride is placed in a catalyst bed at the extreme lower end of the reactor which consists of a stainless steel tube 1½″ in diameter and 36″ in length. A mixture of acetylene and hydrogen cyanide in the mol ratio of about 1.5:1 diluted with about 1 mol of nitrogen is preheated to about 75° C. and passed downward through the catalyst bed at a gaseous space velocity of about 1000 for a period of 24 hours. The reactor effluent is passed through a mild caustic wash before absorption in kerosene. The acrylonitrile enriched kerosene is distilled to recover a substantially pure acrylonitrile.

*Example II*

50 grams of a catalyst comprising gamma alumina impregnated with about 10% by weight of boron trifluoride is placed in a reactor as described above. A mixture of propyne and hydrogen cyanide in the mol ratio of about 1.5:1 diluted with about 1 mol of nitrogen is preheated to about 75° C. and passed downward through the catalyst bed at a gaseous space velocity of about 1000 for a period of 24 hours. The reactor effluent is passed through a mild caustic wash before absorption in kerosene. The crotononitrile enriched kerosene is distilled to recover a substantially pure crotononitrile.

*Example III*

50 grams of a catalyst comprising gamma alumina impregnated with about 10% by weight of boron trifluoride is placed in a reactor as described in Example I. A mixture of 2-butyne and hydrogen cyanide in the mol ratio of about 1.5:1 and diluted with about 1.5 mols of nitrogen is preheated to about 80° C. and passed downward through the catalyst bed at a gaseous space velocity of about 1000 for a period of 24 hours. The reactor effluent is passed through a mild caustic wash before adsorption in kerosene. The enriched kerosene is distilled to recover a substantially pure 2-methyl-2-crotononitrile.

*Example IV*

50 grams of a catalyst comprising gamma alumina impregnated with about 10% by weight of boron trifluoride is placed in a reactor as described in Example I. A mixture of 3-methyl-1-butyne and hydrogen cyanide in the mol ratio of about 1.5:1 diluted with about 1.5 mols of nitrogen is preheated to about 80° C. and passed downward through the catalyst bed at a gaseous space velocity of about 1000 for a period of 24 hours. The reactor effluent is passed through a mild caustic wash before absorption in kerosene. The enriched kerosene is distilled to recover a substantially pure 4-methyl-2-pentenenitrile.

*Example V*

50 grams of a catalyst comprising gamma alumina impregnated with about 10% by weight of boron trifluoride is placed in a reactor as desvribed in Example I. A mixture of 3-buten-1-yne and hydrogen cyanide in the ratio of about 1.5:1 diluted with about 1.5 mols of nitrogen is preheated to about 80° C. and passed downward through the catalyst bed at a gaseous space velocity of about 1000 for a period of 24 hours. The reactor effluent is passed through a mild caustic wash before absorption in kerosene. The enriched kerosene is distilled to recover a substantially pure 2,4-pentadienenitrile.

*Example VI*

50 grams of a catalyst comprising gamma alumina impregnated with about 10% by weight of boron trifluoride is placed in a reactor as described in Example I. A mixture of butadiene and hydrogen cyanide in the ratio of about 1:2 diluted with about 1.5 mols of nitrogen is preheated to about 80° C. and passed downward through the catalyst bed at a gaseous space velocity of about 1000 for a period of 24 hours. The reactor effluent is passed through a mild caustic wash before absorption in kerosene. The enriched kerosene is distilled to recover a substantially pure adiponitrile.

I claim as my invention:

1. A process for the preparation of a nitrile which comprises continuously passing a vaporous mixture of hydrogen cyanide with an unsaturated hydrocarbon selected from the group consisting of alkenes, alkadienes and alkynes containing less than 10 carbon atoms per molecule over a catalyst consisting essentially of boron trifluoride adsorbed on an activated alumina, at a temperature of from about 0° C. to about 200° C. and at a pressure of from about atmospheric to about 10 atmospheres, and recovering the resultant nitrile.

2. A process for the preparation of a nitrile which comprises continuously passing a vaporous mixture of free boron trifluoride and hydrogen cyanide with an unsaturated hydrocarbon selected from the group consisting of alkenes, alkadienes and alkynes containing less than 10 carbon atoms per molecule over a catalyst consisting essentially of boron trifluoride adsorbed on an activated alumina, at a temperature of from about 0° C. to about 200° C. and at a pressure of from about atmospheric to about 10 atmospheres, and recovering the resultant nitrile.

3. A process for the preparation of acrylonitrile which comprises continuously passing a vaporous mixture of free boron trifluoride and acetylene with hydrogen cyanide over a catalyst consisting essentially of boron trifluoride adsorbed on an activated alumina, at a temperature of from about 0° C. to about 200° C. and at a pressure of from about atmospheric to about 10 atmospheres, and recovering the resultant acrylonitrile.

4. A process for the preparation of a nitrile which comprises continuously passing a vaporous mixture of hydrogen cyanide with an unsaturated hydrocarbon selected from the group consisting of alkenes, alkadienes and alkynes containing less than 10 carbon atoms per molecule over a catalyst consisting essentially of boron trifluoride adsorbed on gamma alumina, at a temperature of from about 0° C. to about 75° C. and at a pressure of from about atmospheric to about 5 atmospheres, and recovering the resultant nitrile.

5. A process for the preparation of acrylonitrile which comprises continuously passing a vaporous mixture of acetylene with hydrogen cyanide over a catalyst consisting essentially of boron trifluoride adsorbed on gamma alumina, at a temperature of from about 0° C. to about 75° C. and at a pressure of from about atmospheric to about 5 atmospheres, and recovering the resultant acrylonitrile.

6. A process for the preparation of crontononitrile which comprises continuously passing a vaporous mixture of propyene with hydrogen cyanide over a catalyst consisting essentially of boron trifluoride adsorbed on gamma alumina, at a temperature of from about 0° C. to about 75° C. and at a pressure of from about atmospheric to about 5 atmospheres, and recovering the resultant crotononitrile.

7. A process for the preparation of 2-methyl-crotononitrile which comprises continuously passing a vaporous mixture of 2-butyne with hydrogen cyanide over a catalyst consisting essentially of boron trifluoride adsorbed on gamma alumina, at a temperature of from about 0° C. to about 75° C. and at a pressure of from about atmospheric to about 5 atmospheres, and recovering the resultant 2-methyl-crotononitrile.

8. A process for the preparation of 4-methyl-2-pentenenitrile which comprises continuously passing a vaporous mixture of 3-methyl-1-butyne with hydrogen cyanide over a catalyst consisting essentially of boron trifluoride adsorbed on gamma alumina, at a temperature of from about 0° C. to about 75° C. and at a pressure of from about atmospheric to about 5 atmospheres, and recovering the resultant 4-methyl-2-pentenenitrile.

9. A process for the preparation of 2,4-pentadienenitrile which comprises continuously passing a vaporous mixture of 3-buten-1-yne with hydrogen cyanide over a catalyst consisting essentially of boron trifluoride adsorbed on gamma alumina, at a temperature of from about 0° C. to about 75° C. and at a pressure of from about atmospheric to about 5 atmospheres, and recovering the resultant 2,4-pentadienenitrile.

References Cited in the file of this patent

UNITED STATES PATENTS

| | | |
|---|---|---|
| 2,402,873 | Coffman et al. | June 25, 1946 |
| 2,653,963 | Cowen et al. | Sept. 29, 1953 |
| 2,698,337 | Heider et al. | Dec. 28, 1954 |
| 2,779,805 | Millard | Jan. 29, 1957 |